United States Patent
Stokes et al.

(10) Patent No.: US 6,339,827 B1
(45) Date of Patent: Jan. 15, 2002

(54) METHOD FOR SECURING SENSITIVE DATA IN A LDAP DIRECTORY SERVICE UTILIZING A CLIENT AND/OR SERVER CONTROL

(75) Inventors: Ellen Jean Stokes, Liberty Hill; Ivan Matthew Milman, Austin, both of TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 08/968,100

(22) Filed: Nov. 12, 1997

(51) Int. Cl.[7] ................................. H04L 9/32
(52) U.S. Cl. ..................................... 713/176
(58) Field of Search ............... 380/21, 23; 713/200, 713/201, 202, 176, 170; 709/229

(56) References Cited

U.S. PATENT DOCUMENTS 5,442,771 A * 8/1995 Filepp et al. ............... 395/650
5,787,172 A * 7/1998 Arnold ........................ 380/21
5,812,669 A * 9/1998 Jenkins et al. ............... 380/25

OTHER PUBLICATIONS

Newton, Harry. "Newton's Telecom Dictionary." Eighth Edition. Flatiron Publishing. 1994. p. 827.*

* cited by examiner

Primary Examiner—Gail Hayes
Assistant Examiner—Anthony DiLorenzo
(74) Attorney, Agent, or Firm—Jeffrey S. LaBaw; Joseph R. Burwell; David Judson

(57) ABSTRACT

The lightweight directory access protocol (LDAP) is extended to include client- and server-based controls for securing sensitive data in the directory service. The set of controls include a client control implemented on a client machine, and/or a server control implemented on a server machine. It is not required that both controls be implemented together, and a client machine may implement the client control irrespective of whether a server involved in the directory operation is running the server control.

45 Claims, 4 Drawing Sheets

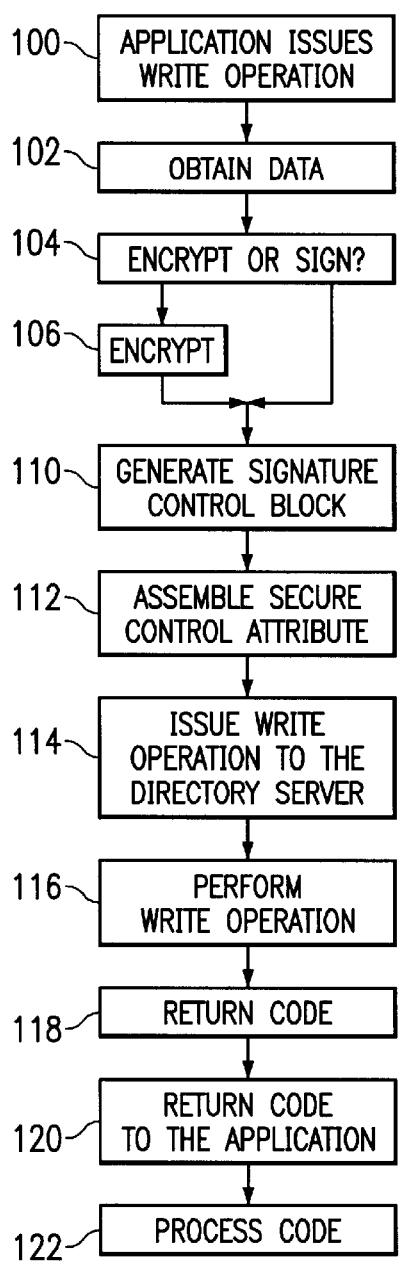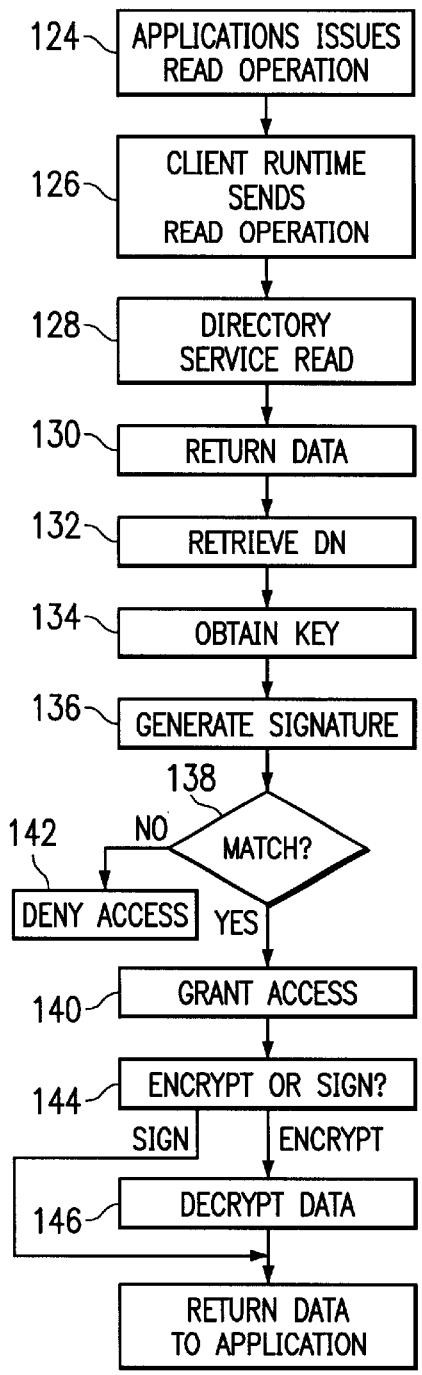
FIG. 7
FIG. 8

METHOD FOR SECURING SENSITIVE DATA IN A LDAP DIRECTORY SERVICE UTILIZING A CLIENT AND/OR SERVER CONTROL

BACKGROUND OF THE INVENTION

1. Technical Field

The present invention relates generally to client-server protocols for accessing a directory service in a distributed computer environment and, in particular, to a method of securing sensitive data in such a directory service.

2. Description of the Related Art

LDAP is the Lightweight Directory Access Protocol, which is a known protocol for accessing a directory service in a computer network such as the Internet. LDAP is an evolving protocol that is based on a client-server model in which a client makes a TCP/IP connection to an LDAP server, rends requests, and receives responses. The LDAP information model is based on an "entry", which contains information about some object. Entries are typically organized in a specified tree structure, and each entry is composed of attributes. The protocol defines a number of directory service operations with respect to the tree (and data therein) including authentication, search and retrieval, entry addition/deletion and information modification.

The directory is useful for storing information about resources in the computer network. According to the protocol, any entity can access the directory and the resource information in the directory subject to authentication and authorization. Presently, data within the LDAP directory service is stored "as is," i.e. in the cleartext form in which it was transmitted to the directory. In many applications, however, there is a need to store data in an encrypted manner, A representative example would be the case where the directory service is used to store passwords, user desktop configurations, and other sensitive, confidential or otherwise privileged data that may be subject to security attacks.

There is thus a need to provide techniques to store and retrieve sensitive data in a client-server based directory service such as LDAP. The present invention addresses this problem.

BRIEF SUMMARY OF THE INVENTION

It is a primary object of this invention to secure sensitive data in a directory service of a client-server based computer network.

It is another primary object of this invention to extend a directory service through a set of client and server controls useful in securing sensitive data in the directory service.

It is a particular object of this invention to implement a "client-side" control for a directory access protocol to secure sensitive data provided from a client application to the directory service.

It is another particular object of this invention to implement a "server-side" control for a directory access protocol to secure sensitive data within the directory service.

A more general object of this invention is to secure sensitive data provided to or from a directory service in a client-server computer network such as the Internet.

A particular object of this invention is to extend the lightweight directory access protocol (LDAP) to include client- and server-based controls for securing sensitive data in the directory service.

A set of controls include a client control implemented on a client machine, and/or a server control implemented on a server machine. It is not required that both controls be implemented together, and a client machine may implement the client control irrespective of whether a server involved in the directory operation is running the server control. The server control is composed of elements that preferably are also elements of the client control.

The client control generally comprises a control block including identifying information, a signature control block, and a signature. The signature preferably comprises a digital signature of the data (which first may be encrypted), the control block and the signature control block, During a given directory service operation from a client machine, the data and the client control are transmitted from the client to the directory service in a message envelope.

A preferred client control according to the invention enables an application to secure given data in a Lightweight Directory Access Protocol (LDAP) directory service of a client-server computer network, where the computer network comprises a client machine running the application and a server supporting the LDAP directory service. In this preferred embodiment, the client control comprises a control portion, a signature control block, and a signature. The control portion includes given identifying information including a control type, a first algorithm identifier and a first key identifier. The signature control block preferably comprises a second algorithm identifier and a second key identifier. The signature is preferably a digital signature of (a) the data, (b) the control block and (c) the signature control block against an algorithm and a key identified by the second algorithm identifier and the second key identifier. The data and the client control are transmitted from the client to the server during a given directory service operation, such as a "write" operation. In this embodiment, the first algorithm identifier specifies an encryption or signing algorithm registered in the directory service and the first key identifier specifies a key stored for use by the registered algorithm. The registered algorithm and the algorithm identified by the second algorithm identifier may be the same or different.

The particular server side control includes components that preferably are also components that comprise the client side control. The server control, however, does not generally include the signature control block or the signature.

Another feature of the present invention is the providing of a computer program product for use to facilitate secure access to a directory service of a client-server computer network. The computer program product typically executes in a client computer that is running an application. The computer network includes at least one server supporting the directory service. The computer program product comprises means for generating a digital signature over given data, a control block and a signature control block. The signature is generated by a signing algorithm and a key identified by an algorithm identifier and a key identifier in the signature control block. In addition, the computer program product includes means, responsive to a directory service operation initiated by the application, for transmitting the signed components (the data, control block and signature control block) from the client machine to the server.

Thus, a particular directory service typically includes a client computer that includes the capability of generating the client control and using the control during a particular directory service operation to secure data written to or retrieved from the directory. Preferably, the directory service conforms to the lightweight directory access protocol (LDAP).

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 7 is a flowchart illustrating an exemplary "write" operation implemented using a client control of the present invention;

FIG. 8 is a flowchart illustrating an exemplary "read" operation implemented using the client control of the present invention;

DETAILED DESCRIPTION OF THE PREFERRED EMBODIMENT

Figure 1:
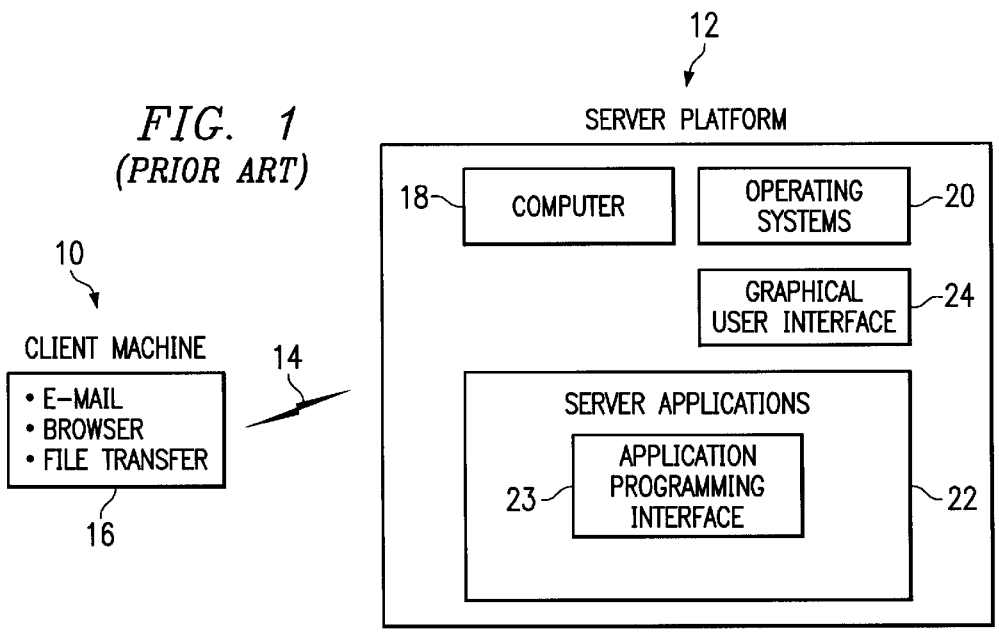
FIG. 1 is a representative client-server computer system of the Prior Art.

Client-server network based applications typically access network directory data through the LDAP Internet standard. Thus, by way of background, FIG. 1 illustrates a representative client-server network system. A client machine 10 is connected to a server platform 12 via network 14. For Illustrative purposes, network 14 is the Internet, an intranet, an extranet, or some other known or hereinafter-developed network connection. The client and server communicate with each other using various protocols including LDAP, TCP/IP and others, for example, the Hypertext Transfer Protocol (HTTP). Thus, a representative server platform 12 is one of a plurality of servers which are accessible by clients, one of which is illustrated by machine 10. A representative client machine includes a browser 16, which is a known software tool used to access the servers of the network. The server platform typically supports files (collectively referred to as a "Web" site) in the form of hypertext documents and objects. The server also supports a directory service in which network directory data is stored. Such data comprises, without limitation, user pacewords, user identifying information (e.g., address, telephone number, social security number, etc.), user desktop configuration data, and the like.

A representative server platform 12 comprises an IBM RISC System/6000 computer 18 (a reduced instruction set of so-called RISC-based workstation) running the AIX® (Advanced Interactive Executive Version 4.1 and above) operating System 20 and a Web server program 22, such as Netacape Enterprise Server Version 2.0, that supports interface extensions. Tho platform 12 also includes a graphical user interface (GUI) 24 for management and administration. The server 18 also includes an Application Programming Interface (API) 23 that provides extensions to enable application developers to extend and/or customize the core functionality thereof through software programs commonly referred to as "plug-ins."

A representative client is a personal computer that is x86-, PowerPC®- or RISC-based, that includes an operating system such as IBM® OS/2® or Microsoft Windows 95, and that includes a browser, such as Netscape Navigator 3.0 (or higher), having a Java Virtual Machine (JVM) and support for application plug-ins and helper applications.

Figure 2:
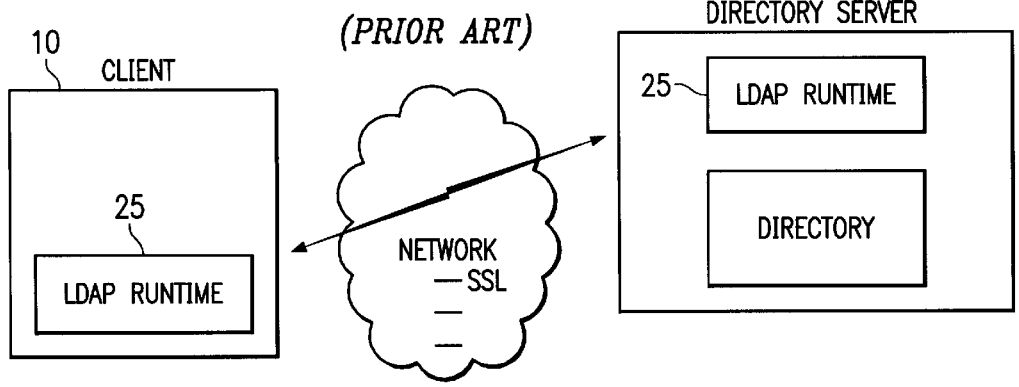
FIG. 2 is an illustrative LDAP directory service implementation.
Figure 3:
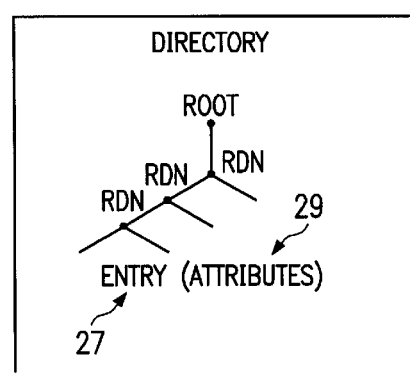
FIG. 3 illustrates a directory used in the LDAP directory service.

A block diagram of the LDAP directory service is shown in FIG. 2. As is well-known, LDAP is the lightweight directory access protocol, and this protocol has been implemented in the prior art, e.g., as either a front end to the X.500 directory service, or as a standalone directory service. According to the protocol, a client machine 10 makes a TCP/IP connection to an LDAP server 12, sends requests and receives responses. LDAP server 12 supports a directory 21 as illustrated in a simplified form in FIG. 3. Each of the client and server machines further include a directory "runtime" component 25 for implementing the directory service operations as will be described below. The directory 21 is based on the concept of an "entry" 27, which contains information about some object (e.g., a person). Entries are composed of attributes 29, which have a type and one or more values. Each attribute 29 has a particular syntax that determines what kinds of values are allowed in the attribute (e.g., ASCII characters, .jpeg file, etc.) and how these values are constrained during a particular directory operation.

The directory tree is organized in a predetermined manner, with each entry uniquely named relative to its sibling entries by a "relative distinguished name" (RDN). An RDN comprises at least one distinguished attribute value from the entry and, at most, one value from each attribute is used in the RDN. According to the protocol, a globally unique name for an entry, referred to as a "distinguished name" (DN), comprises a concatenation of the RDN sequence from a given entry to the tree root.

Figure 4:
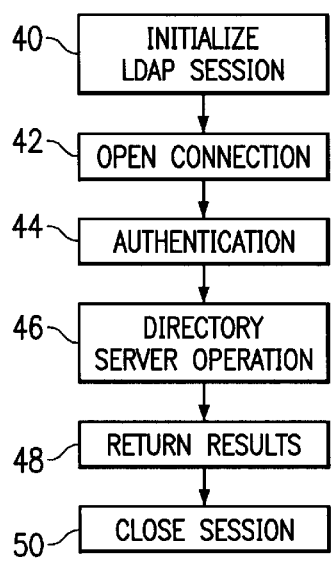
FIG. 4 is a simplified flowchart of a basic LDAP directory service session.

LDAP includes an application programming interface (API), as described in "The C LDAP Application Program Interface", IETF Task Force Working Draft, Jul. 29, 1997, which is incorporated herein by reference. An application on a given client machine uses the LDAP API to effect a directory service "session" according to the flowchart of FIG. 4. At step 40, an LDAP session with a default LOAP server is initialized. At step 42, an API function ldap__init( ) returns a handle to the client, and this handle allows multiple connections to be open at one time. At step 44, the client authenticates to the LDAP server using, for example, an API ldap__bind( ) function. At step 46, one or more LDAP operations are performed. For example, the API function ldap__search( ) may be used to perform a given directory search. At step 48, the LDAP server returns the results. The session is then closed at step 50 with the API ldap__unbind( ) function then being used to close the connection.

LDAP Version 3 (LDAPv3) directory operations may be extended through the use of "controls." controls may be sent to a server or returned to the client with any LDAP message. Such controls are defined by the LDAP API as server controls. In addition, the LDAP APl also supports a client-side extension mechanism through the use of client controls. These controls effect the behavior of the LDAP API only and, preferably, are not sent to the server. The following data structure is used to represent both types of controls:

```
typedef struct ldapcontrol {
    char          *ldctl_oid;
    char          ldctl_iscritical;
    struct berval ldctl_value;
} LDAPControl, *PLDAPControl;
where the fields in the ldapcontrol structure have the
following meanings:
ldctl_oid        control type, represented as a string
ldctl_iscritical critical status (True/False).
ldctl_value      data associated with the control
```

The control type field must be a UTF-8 encoded dotted-decimal representation of an object Identifier that uniquely identifies the control. This prevents conflicts between the control names. The criticality field is either TRUE or FALSE. The criticality status field indicates whether the control is critical or not. If this field is non-zero, the operation will only be carried out if the control is recognized by the server and/or client. The value field contains any information associated with the control, and its format is defined for the control.

The above-described control format is specified in "Lightweight Directory Access Protocol (v3)" issued by the IETF Task Force, dated Aug. 5, 1997, and incorporated herein by reference. That specification, however, does not define any controls.

The present invention describes and implements two (2) data controls for use in the LDAP directory service. As will be seen, the characteristics of these controls may be useful for other types of directory services supported in a client-server based computer network. Thus, the following description should be considered merely a preferred embodiment of the invention.

The Secure Sensitive Data Controls

There are two controls for securing sensitive data: a client-side control in which all functions are controlled by the client, and a server-side control in which all functions are controlled by the server. A given application running on a client or a server may issue ether type of control. However, in the preferred embodiment, any given data is secured by only one of these controls and, preferably, there is no conversion between the two controls.

The "Client Secure Sensitive Data " Control

Figure 5:
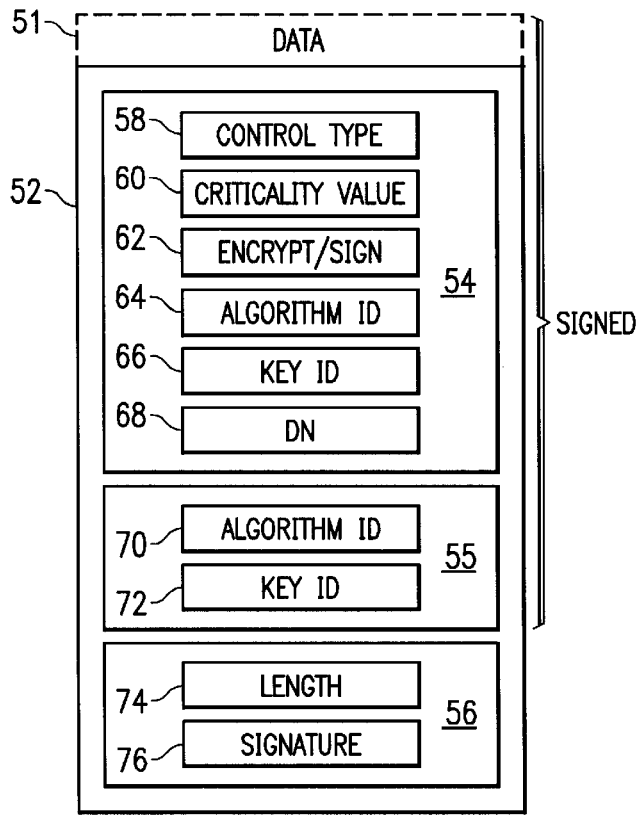
FIG. 5 is a block diagram of a client control according to the present invention.

To permit the data to be stored and retrieved securely, a new "client secure sensitive data" control is defined herein. It is illustrated in FIG. 5. In this example, the data block 51 is shown in phantom because the data is conceptually distinct from the client control itself. This is not required, however, as the client control may be construed to include the data block. Preferably, the client control is always critical and thus the criticality value is set to TRUE. Thus, if the client machine's directory runtime docs not support this control, then the given directory operation fails.

According to the invention, any and all values of an attribute of an object can be stored in the directory encrypted or signed and the signature verified when the data is returned (read/searched) and decrypted or signature verified. The control can be applied to any given attributes of an object, or even all attributes of any object.

A preferred syntax of the client secure sensitive data" control is set forth below;

```
controlType     <objectIdentifier (OID)>
criticality     TRUE
controlValue    encrypt|sign,
                algorithmID,
                keyID,
                DN,
                signatureControlBlock
where:
encrypt|sign    specifies whether the data
                is to be encrypted or signed
algorithmID     string label for a
                registered encryption or
                signing algorithm to use,
                e.g. DES, SHA
keyID           string label specifying
                which key to use for
                encryption and signing
DN              distinguished name of the
                user storing sensitive data;
The signatureControlBlock has the following syntax:
signatureControlBlock  algorithmID
                       keyID
where:
algorithmID     string label for a
                registered signing algorithm
                to use, e. g. SHA
keyID           string label specifying
                which key to use for signing
```

The signatureControlBlock may be construed to be a part of the "controlValue" or separate therefrom. The signature is preferably a digital signature of the data block 51 and various components of the control block and the signature control block. The signature has a length and is preferably created by the algorithm and key pointed to by the algorithmID and keyID fields of the signatureControlBlock. The signature prevents a compromise of the server that can cause the client to disclose the data. The signature may be construed as part of the controlValue (and thus part of the control) or separate therefrom.

As can be seen in FIG. 5, the client control 52 comprises a control block 54 a signatureControl Block 55 and the signature block 56. Control block 54 comprises a number of parameters: controlType 58, criticality type value 60, and several parameters of the "control value" including "encrypt|sign" value 62, algorithmID 64, keyID 66, and DN 68. SignatureControlBlock 55 preferably comprises algorithmID 70 and keyID 72. Signature block 56 has a length value 74, and the digital signature 76. Digital signature 76 is preferably formed by applying the algorithm and key pointed to by the algorithmID 70 and keyID 72 fields against three (3) concatenated elements: the data (or come portion thereof), the control block 54 (or some portion thereof), and the signatureControlBlock 55 (or some portion thereof). Typically, the algorithmID 70 and the keyID 72 are specified by the application, and the digital signature 76 and its length value 74 are then generated at runtime. Thus, the signature Block 56 has various components that are "built" during runtime. According to the preferred embodiment, the algorithm and key pointed to by the algorithmID and keyID in both the control block and the signatureControlBlock may be different, and in most cases these values are different when encryption is specified in the control. Preferably, there are separate keys for encryption and signing. If signing is specified, then it is assumed the algorithmID and keyID in both blocks are identical, in which the values from the signatureControlBlock are used.

According to the LDAP specification, the client control is transmitted over the physical connection between the client and the directory service. The client control (or some portion thereof) is transmitted together with the data block (or some portion thereof) in a message envelope configuration as set forth in that specification. If the physical connection provides encryption (e.g., if an SSL connection in used), then the data is carried on the connection in an encrypted manner.

The "Server Secure Sensitive Data" Control

The invention also defines a "server secure sensitive data" control to permit data to be stored and retrieved securely from a server application. This control is also always considered critical and thus its criticality value is TRUE. If the directory server does not support this control, then the operation fails. Any and all values of an attribute of an object may be stored in the directory encrypted, and the values are preferably decrypted before the data is returned to the client. The control can be applied to any given attributes of an object, or even all attributes of any object.

The preferred syntax of this server-side control follows below:

| | |
|---|---|
| controlType | <object Identifier (OID) > |
| criticality | TRUE |
| controlValue | encrypt \| sign |
| | algorithmID, |
| | keyID |
| where: | |
| encrypt\|sign | specifies whether the data is to be encrypted or signed |
| algorithmID | string label for a registered encryption algorithm to use e.g. DES |
| keyID | string label specifying which key to use for encryption or signing |

Figure 6:
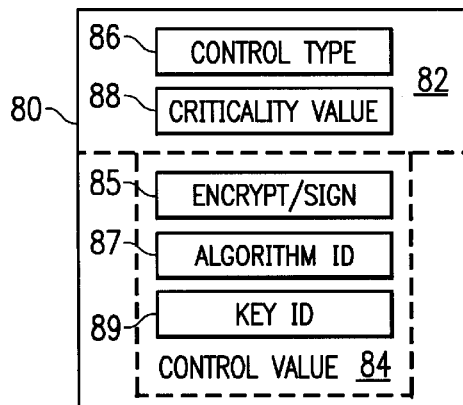
FIG. 6 is a block diagram of a server control according to the present invention.

The server control 80 is illustrated in FIG. 6 and includes the control block 82, and a data securing information block 84. Control block 82 includes the control type value 86 and the criticality value type 88. The data securing information block 84 includes the encrypt|sign value 85, the algorithmID 87 and the keyID 89. Thus, the server control includes a subset of the components that comprise the client control previously described.

Meta-Data For An Encrypted/Signed Directory Attribute

According to the present invention, an object stored in the directory may have one or more attributes associated with it. One such attribute is an operational attribute (wherein the attribute is sot and controlled by the directory server, not the user application) that describes the secure sensitive data control (meta-data) associated with a given attribute of an object. It is preferably a multi-valued attribute having the following syntax:

| | |
|---|---|
| secureControl={attributeName, meta-data}; | |
| where: | |
| attributeName | specifies name of the attribute for which controlValue applies |
| meta-data | the meta-data associated with securing the data |
| where meta-data is defined as containing (MUST=mandatory, MAY=optional): | |
| MUST | { |
| | controlOID, |
| | encrypt (sign, |
| | algorithmID, |
| | keyID, |
| | DN |
| | } |
| MAY | { |
| | signatureControlBlock } |
| | algorithmID, |
| | keyID, |
| | DN, |
| | signature } |
| | } |

The MAY section is only present if the data is secured by the "client secure sensitive data" control or if "sign" in the MUST section is specified. Preferably, only the directory server has access control on this attribute.

The client and server controls described above are useful in storing and retrieving data to/from the directory. The following illustrates how these controls may be implemented to provide the objects and advantages of the present invention.

The Client Control

The client control may be used for encryption, decryption, signing and signature verification. Use of the signatureControlBlock for client operation is encouraged as will be seen. At machine startup time, the configuration of the directory client runtime is initialized. This initialization may be effected using a conventional menu-driven interface to establish or select the control value parameters (namely, algorithmIDs and keyIDs) and to set a flag to establish whether the client is to be used for the entire session or just for a particular directory operation.

Assume now that a given application is running on the client machine and desires to perform a directory operation such as writing given object data. As described above with respect to FIG. 4, the application has opened a connection to the directory service (step 42) and has been authenticated (step 44). A write directory operation (step 46) using the inventive client control is now described and illustrated in the flowchart of FIG. 7.

The routine begins at step 100 when the application issues a write operation (to the client runtime) to write an attribute of an object to the directory. It is assumed that LDAP control specifies a client (as opposed to a server) operation. Thus, at step 102, the client directory service runtime obtains the data in the control value of the client control which has been previously specified during initialization. It then performs the following operations.

At step 104, a test is made to determine the setting of the encrypt|sign value 62 in the control block. If the outcome of the test at step 104 indicates that "encrypt" is specified, the routine continues at step 106 to encrypt the data (in block 51) using the algorithm and key specified in algorithmID 64 and keyID 66, respectively. Thereafter, or if the outcome of the test at step 104 indicates that "sign" is specified, the routine continues at step 110 to generate the signature.

At step 112, the routine adds the secureControl attribute to (in this example) the "write" operation. The routine then continues at step 114 to issue the write operation to the directory server. As described in the LDAP specification, this operation transmits the data and the client control over the "wire" in a message envelope. At step 116, the write operation is performed at the directory by the directory service runtime. The routine then continues at step 118 with the directory service returning to the client directory runtime given code (indicating that the write operation was successful). At step 120, the code is returned to the application. The application then processes the code at step 122. This completes the processing.

FIG. 8 illustrates a flowchart of a "read" operation using the client control. As discussed above, it is assumed that the application is running on the client machine and has bound to the directory service and been authenticated in the usual manner. The routine then begins at step 124 with the application issuing a read operation to the client runtime to get an attribute (i.e. given data) of an object from the directory. At step 126, the client directory runtime sends the read operation to the directory server to read the attribute of the object. No control is sent, however. The routine then continues at step 128 with the directory service performing the read operation. At step 130, the service returns the requested data along with the secureControl attribute that was stored with the data. The directory server preferably does not process the secureControl attribute instructions for any requested attribute marked for client-side operations.

The following steps are then performed by the client directory runtime. At step 132, the distinguished name (DN) of the client is retrieved from storage. The routine then checks the signature in the following manner. At step 134, using the DN of the caller, the routine obtains the key referred to by the keyID in the signatureControlBlock section returned in the securecontrol attribute. At step 136, using the DN of the caller, the routine uses the key and the algorithm (pointed to by the algorithmID in the signature-ControlBlock in the returned secureControl attribute) to generate a signature over the data and the control block. A test is then performed at step 138 to determine whether the generated signature is the same as the signature in the returned secureControl attribute. If the outcome of the test at step 136 is positive, the routine continues at step 140 to grant the calling application access to the returned data. If the outcome of the test at step 138 is negative, access is denied at step 142.

Assuming access were granted, the routine then continues at step 144 to determine whether the value of the operation is "encrypt" or "sign". If "encrypt" were specified, the routine continues at step 146. In particular, with the DN of the caller, the data is decrypted using the algorithm and key specified in the algorithmID and keyID, respectively. The data is then returned to the application at step 148. The data is also returned to the application at step 148 if step 144 indicates that "sign" was specified. After step 148, the application unbinds from the directory service by closing the connection. This completes the processing.

The Server Control

Figure 9:
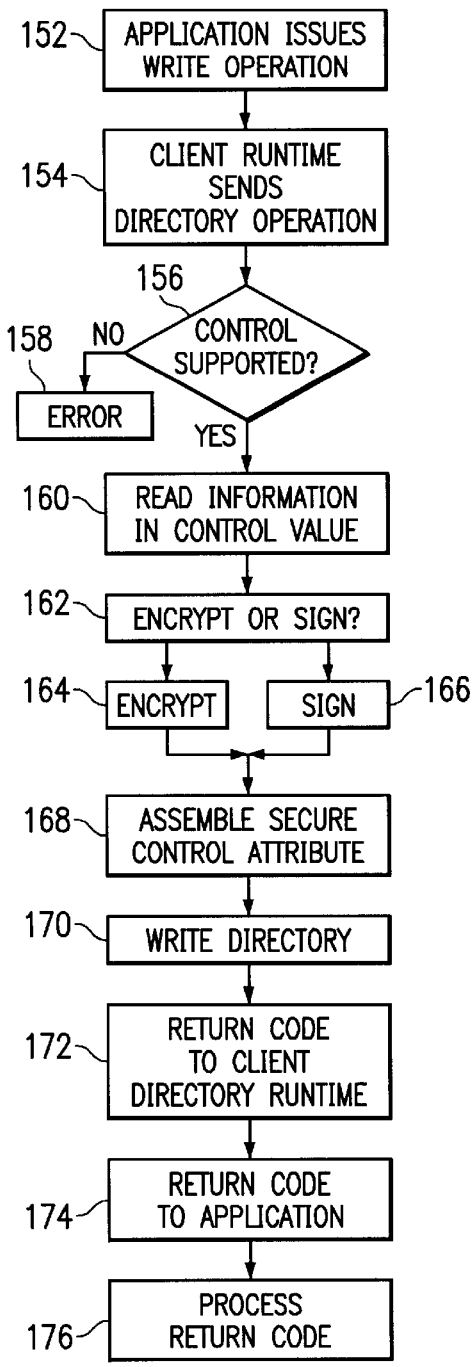
FIG. 9 is a flowchart illustrating an exemplary "write" operation implemented using a server control of the present invention.

The (directory) server side may also be used for encryption, decryption, signing and signature verification. As previously described, the server control is configured, preferably at machine startup, to fill in the appropriate control value parameters and to set the control for either session-wide or per-operation implementation. It is assumed that the application (running on the client machine) has opened a connection to the directory service and has been authenticated in the usual manner. FIG. 9 illustrates a flowchart of a preferred routine for enabling the application to store (i.e. write) sensitive data in the directory using the server control.

The routine begins at step 152 with the application issuing a write operation (to the client runtime) to write an attribute of an object (i.e. the given data) to the directory along with the secureControl attribute that specifies a server operation. At step 154, the client directory runtime sends the directory operation to the directory server. At test is then made at step 156 to determine whether the directory server supports the control. If not, an error is returned to the client directory runtime and the application at step 158. Otherwise, the routine continues at step 160 with the directory server reading the information in the control value.

The following operations are then performed. At step 162, a test is made to determine whether "encrypt" or "Sign" is specified. If "encrypt" is specified, the routine continues at step 164 to encrypt the data using the algorithm and the key specified in the algorithm ID and keyID, respectively. If "sign" is specified, however, the routine continues at step 166 to sign the data using the algorithm and key specified in the algorithmID and keyID, respectively. In either case, the routine then continues at step 168 to assemble the secureControl attribute.

The requested attribute and the generated secureControl meta-data attribute for the object are then written to the directory in the step 170. At step 172, the routine returns a code to the client directory runtime. The routine then continues at step 174 with the client directory runtime receiving the code from the directory server for the operation and returning that code to the application. The application then processes the return code at step 176. This completes the write operation processing using the server aide control.

Figure 10:
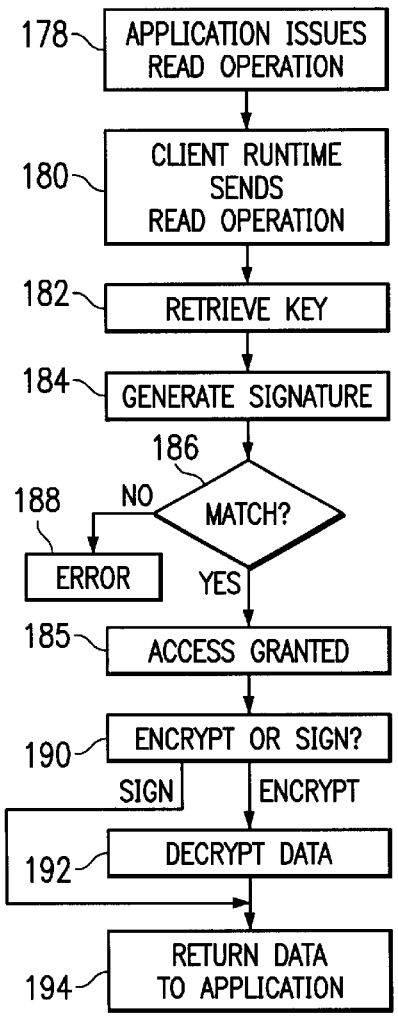
FIG. 10 is a flowchart illustrating an exemplary "read" operation implemented using the server control of the present invention.

FIG. 10 is a flowchart illustrating a "read" operation using the server side control. Again, it is assumed that the application has bound to the directory server and has been authenticated. The routine begins at step 178 with the application issuing a read operation (to the client runtime) to got an attribute of an object from the directory. At step 180, the client directory runtime then sends the read operation to the directory server to read an attribute of the object. No control is sent, however.

The directory server then performs the following operations to check the signature. At step 182, the routine gets the key referred to by the keyID in the signatureControlBlock section returned in the secureControl attribute. At step 184, the routine generates a signature (over the data and control block) using the key and the algorithm (pointed to by the algorithmID in the signatureControlBlock section returned in the secureControl attribute). A test is then performed at step 186 to determine whether the signature generated in step 184 matches the signature in the returned secureControl attribute. If so, the calling application is granted access to that returned data in step 185. If the outcome of the test at step 186 is negative, an error message is returned at step 188.

After checking the signature, the routine then continues at step 190 to test the "encrypt|sign" value. If "encrypt" were specified, the data is decrypted at step 192 using the algorithm and key specified in the algorithmID and keyID, respectively. The client directory runtime then returns the data to the application at step 194. The data is likewise returned at step 194 if "sign" were specified as indicated by the test at step 190. The application then unbinds from the directory server to complete the processing.

Although the server control is relatively easier to implement, one of ordinary skill in the art will appreciate that the client control provides an additional degree of security. In particular, any compromise of the server keys will compromise the server control. However, in such case, the client control will remain unaffected.

In the preferred embodiment, the client control and the server control are used, and both controls conform to the LDAP Version 3 specification. According to the invention, a control may be implemented session-wide or it may exist on a per-directory operation basis. AB noted, the control may be client-based, where the operation occurs only, on the client, or it may be server-based, where the operation occurs only on the server or is split between client and server. Further, the control is typically marked as critical, which indicates that if the client or server does not support the control, then the operation fails.

One of ordinary skill will appreciate that the implementation of these controls is not limited to the LDAP directory service. The principles of the preset invention are equally applicable to any other client-server based directory service in which it is desired or necessary to secure sensitive data. Thus, the invention should not be construed as limited to providing secure controls for LDAP Version 3 as illustrated in the preferred embodiment. Moreover, the particular techniques for securing the data are likewise merely representative. Thus, any suitable encryption or signing algorithm now existing or hereinafter developed may be used for this purpose.

The present invention provides security for sensitive data in a directory service. Such data includes passwords transmitted by SSO and stored in the LDAP directory or other privileged data. The particular nature and type of data, however, is not an aspect of the present invention, and thus the principles of the invention are applicable to any data type, regardless of the application.

One of the preferred embodiments of the invention (on either the client or server side) is as a set of instructions (program code) in a code module resident in the random access memory of a computer. Until required by the computer, the set of instructions may be stored in another computer memory, for example, in a hard disk drive, or in a removable memory such as an optical disk (for eventual use in a CD-ROM) or floppy disk (for eventual use in a floppy disk drive), or downloaded via the Internet or other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As used herein, "client" should be broadly construed to mean any computer or component thereof directly or indirectly connected or connectable in any known or later-developed manner to a computer network, such as the Internet. The term "server" should also be broadly construed to mean a computer, computer platform, an adjunct to a computer or platform, or any component thereof. Of course, a "client" should be broadly construed to mean one who requests or gets the file, and "server" the entity which downloads the file. Moreover, the invention may be used or practiced in any type of Internet Protocol (IP) client, not just within an HTTP-compliant client having a Web browser. Thus, as used herein, references to "browser" should be broadly construed to cover any client.

Having thus described our invention, what we claim as new and desire to secure by Letters Patent is met forth in the following claims.

What is claimed is:

1. A data processing system utilizing a Lightweight Directory Access Protocol (LDAP) client control for enabling an application to secure given data in an LDAP directory service of a client-server computer network, the LDAP client control further comprising:
    a control portion comprising identifying information including an algorithm identifier and a key identifier; and
    a signature of the given data and the control portion generated using an algorithm and a key identified by the algorithm identifier and the key identifier.

2. The data processing system as described in claim 1 wherein the LDAP client control further comprises a signature control block including the algorithm identifier and the key identifier.

3. The data processing system as described in claim 1 wherein the identifying information of the control block comprises a control type parameter and a criticality parameter.

4. The data processing system as described in claim 1 wherein the identifying information of the control block comprises a distinguished name (DN) that identifies a given entity.

5. The data processing system as described in claim 1 wherein the identifying information of the control block includes information identifying an algorithm registered in the LDAP directory service and a key for use by the registered algorithm.

6. The data processing system as described in claim 5 wherein the registered algorithm is an encryption algorithm.

7. The data processing system as described in claim 5 wherein the registered algorithm is a signing algorithm.

8. The data processing system as described in claim 5 wherein the registered algorithm and the algorithm identified by the algorithm identifier are the same.

9. The data processing system as described in claim 1 wherein the signature has a length value associated therewith.

10. A data processing system utilizing a client control for enabling an application to secure given data in a Lightweight Directory Access Protocol (LDAP) directory service of a client-server computer network, the computer network comprising a client machine running the application and a server supporting the LDAP directory service, the client control further comprising:
    a control portion comprising a control type, a first algorithm identifier and a first key identifier; and
    a signature control block comprising a second algorithm identifier and a second key identifier; and
    a signature of the data, the control portion and the signature control block generated against an algorithm and a key identified by the second algorithm identifier and the second key identifier;
    wherein the client control is adapted to be transmitted together with the data from the client to the server during a given directory service operation.

11. The data processing system as described in claim 10 wherein the first algorithm identifier specifies an algorithm registered in the directory service and the first key identifier specifies a key stored for use by the registered algorithm.

12. The data processing system as described in claim 11 wherein the registered algorithm is an encryption algorithm.

13. The data processing system as described in claim 11 wherein the registered algorithm is a signing algorithm.

14. The data processing system as described in claim 11 wherein the registered algorithm and the algorithm identified by the second algorithm identifier are the same.

15. A data processing system utilizing a Lightweight Directory Access Protocol (LDAP) server control for enabling an application to secure given data in an LDAP directory service of a client-server computer network, the LDAP server control further comprising:
    a control type value;
    a criticality value;
    data securing information comprising:
        a value specifying a given operation;
        an algorithm identifier and a key identifier, the algorithm identifier specify an algorithm registered with the LDAP directory service for effecting the given operation on the data using a key specified by the key identifier.

16. The data processing system as described in claim 15 wherein the given operation is encryption.

17. The data processing system as described in claim 15 wherein the given operation is signing.

18. A computer program product in computer-readable media for use in facilitating secure access to a Lightweight Directory Access Protocol (LDAP) directory service of a client-server computer network, the computer network comprising a client machine running an application and a server supporting the LDAP directory service, the computer program product comprising:
   means for generating a digital signature of given data, a control block having identifying information, an algorithm and a key identifier, and a signature control block generated using an algorithm and a key identified by the algorithm identifier and the key identifier of the signature control block; and
   means responsive to an LDAP directory service operation initiated by the application for transmitting the digital signature from the client to the server.

19. The computer program product as described in claim 18 wherein the control block includes:
   a control type;
   a criticality value;
   a value specifying a given operation;
   the algorithm identifier and the key identifier, the algorithm identifier specifying an algorithm registered with the LDAP directory service for effecting the given operation on the data using a key specified by the key identifier.

20. The computer program product as described in claim 18 wherein the data and the digital signature are transmitted from the client to the server over a secure connection.

21. A computer connectable via a computer network to a server supporting a Lightweight Directory Access Protocol (LDAP) directory service, comprising:
   a processor;
   an operating system;
   an application for executing a given directory service operation; and
   means to facilitate secure access to the LDAP directory service by the application during the given directory service operation, comprising:
      means for generating a digital signature of given data, a control block having identifying information including an algorithm identifier and a key identifier, and a signature control block using an algorithm and a key identified by the algorithm identifier and the key identifier of the signature control block; and
      means responsive to a directory service operation initiated by the application for transmitting the digital signature from the client to the server.

22. The computer as described in claim 21 wherein the control block comprises:
   a control type;
   a criticality value;
   a value specifying a given operation;
   the algorithm identifier and the key identifier, the algorithm identifier specific an algorithm registered with the LDAP directory service for effecting the given operation on the data using a key specified by the key identifier.

23. The computer as described in claim 21 wherein the data and the digital signature are transmitted from the client to the server over a secure connection.

24. A data processing system utilizing a set of controls for use in securing data in a Lightweight Directory Access Protocol (LDAP) directory service, the set of controls comprising in combination:
   a client control, comprising:
      a control portion comprising identifying information; and
      a signature control block including an algorithm identifier and a key identifier;
   a server control, comprising:
      a control portion comprising identifying information; and
      data securing information, comprising:
         a value specifying a given operation;
         an algorithm identifier and a key identifier, the algorithm identifier specifying an algorithm associated with the LDAP directory service for effecting the given operation on the data using a key specified by the key identifier.

25. A method of effecting a Lightweight Directory Access Protocol (LDAP) directory service operation from an application in a client-server computer network, the computer network comprising a client machine running the application and a server supporting the LDAP directory service, comprising the steps of:
   following invocation of the LDAP directory service operation, generating a digital signature of the data, a control block and a signature control block, the control block including identifying information and the signature control block including an algorithm identifier and a key identifier identifying an algorithm and a key for use in generating the digital signature;
   transmitting the digital signature from the client to the server;
   effecting the LDAP directory service operation; and
   returning to the client a result of the LDAP directory service operation.

26. The method as described in claim 25 wherein the LDAP directory service operation is a write operation.

27. The method as described in claim 25 wherein the LDAP directory service operation is a read operation.

28. The method as described in claim 25 further including the step of encrypting the data prior to generating the digital signature.

29. A computer program product in a computer readable medium comprising instructions for utilizing a Lightweight Directory Access Protocol (LDAP) client control for enabling an application to secure given data in an LDAP directory service of a client-server computer network, the LDAP client control further comprising:
   a control portion comprising identifying information including an algorithm identifier and a key identifier; and
   a signature of the given data and the control portion generated using an algorithm and a key identified by the algorithm identifier and the key identifier.

30. The computer program product as described in claim 29 wherein the LDAP client control further comprises a signature control block including the algorithm identifier and the key identifier.

31. The computer program product as described in claim 29 wherein the identify information of the control block comprises a control type parameter and a criticality parameter.

32. The computer program product as described in claim 29 wherein the identifying information of the control block comprises a distinguished name (DN) that identifies a given entity.

33. The computer program product as described in claim 29 wherein the identifying information of the control block includes information identify an algorithm registered in the LDAP directory service and a key for use by the registered algorithm.

34. The computer program product as described in claim 33 wherein the registered algorithm is an encryption algorithm.

35. The computer program product as described in claim 33 wherein the registered algorithm is a signing algorithm.

36. The computer program product as described in claim 33 wherein the registered algorithm and the algorithm identified by the algorithm identifier are the same.

37. The computer program product as described in claim 29 wherein the signature has a length value associated therewith.

38. A computer program product in a computer readable medium comprising instructions for utilizing a client control for enabling an application to secure given data in a Lightweight Directory Access Protocol (LDAP) directory service of a client-server computer network, the computer network comprising a client machine running the application and a server supporting the LDAP directory service, the client control further comprising:

a control portion comprising a control type, a first algorithm identifier and a first key identifier; and a signature control block comprising a second algorithm identifier and a second key identifier; and a signature of the data, the control portion and the signature control block generated against an algorithm and a key identified by the second algorithm identifier and the second key identifier;

wherein the client control is adapted to be transmitted together with the data from the client to the server during a given directory service operation.

39. The computer program product as described in claim 38 wherein the first algorithm identifier specifies an algorithm registered in the directory service and the first key identifier specifies a key stored for use by the registered algorithm.

40. The computer program product as described in claim 39 wherein the registered algorithm is an encryption algorithm.

41. The computer program product as described in claim 39 wherein the registered algorithm is a signing algorithm.

42. The computer program product as described in claim 39 wherein the registered algorithm and the algorithm identified by the second algorithm identifier are the same.

43. A computer program product in a computer readable medium comprising instructions for utilizing a Lightweight Directory Access Protocol (LDAP) server control for enabling an application to secure given data in an LDAP directory service of a client-server computer network, the LDAP server control further comprising:

a control type value;

a criticality value;

data securing information comprising:

a value specifying a given operation;

an algorithm identifier and a key identifier, the algorithm identifier specifying an algorithm registered with the LDAP directory service for effecting the given operation on the data using a key specified by the key identifier.

44. The computer program product as described in claim 43 wherein the given operation is encryption.

45. The computer program product as described in claim 43 wherein the given operation is signing.

\* \* \* \* \*

UNITED STATES PATENT AND TRADEMARK OFFICE
CERTIFICATE OF CORRECTION

| | |
|---|---|
| PATENT NO. | : 6,339,827 B1 |
| DATED | : January 15, 2002 |
| INVENTOR(S) | : Stokes et al. |

It is certified that error appears in the above-identified patent and that said Letters Patent is hereby corrected as shown below:

<u>Column 13,</u>
Line 61, please delete "specific" and insert -- specifying --.

Signed and Sealed this

Twenty-third Day of April, 2002

Attest:

JAMES E. ROGAN
*Attesting Officer*     *Director of the United States Patent and Trademark Office*